(12) United States Patent
Deschaseaux

(10) Patent No.: US 9,116,269 B2
(45) Date of Patent: Aug. 25, 2015

(54) MICROSTRUCTURE WITH WALLS OF DETERMINED OPTICAL PROPERTY AND METHOD FOR MAKING MICROSTRUCTURES

(75) Inventor: Edouard Deschaseaux, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 1041 days.

(21) Appl. No.: 13/186,940

(22) Filed: Jul. 20, 2011

(65) Prior Publication Data

US 2012/0019922 A1     Jan. 26, 2012

(30) Foreign Application Priority Data

Jul. 21, 2010   (FR) ........................... 10 55944

(51) Int. Cl.
| | |
|---|---|
| *G02B 27/00* | (2006.01) |
| *G02B 5/00* | (2006.01) |
| *G02B 1/10* | (2015.01) |
| *G02F 1/1333* | (2006.01) |
| *G02F 1/1335* | (2006.01) |

(52) U.S. Cl.
CPC .... *G02B 5/005* (2013.01); *G02B 1/10* (2013.01); *G02F 1/133377* (2013.01); *G02F 1/133512* (2013.01)

(58) Field of Classification Search
None
See application file for complete search history.

(56) References Cited

U.S. PATENT DOCUMENTS

| | | | |
|---|---|---|---|
| 3,863,249 A | 1/1975 | Olah | |
| 3,978,580 A | 9/1976 | Leupp et al. | |
| 4,989,226 A | 1/1991 | Woodbury et al. | |
| 5,417,801 A | 5/1995 | Bol | |
| 5,838,414 A | 11/1998 | Lee | |
| 6,014,188 A | 1/2000 | Yamada et al. | |
| 6,063,653 A | 5/2000 | Lin et al. | |
| 6,266,121 B1 * | 7/2001 | Shigeta et al. | 349/156 |
| 6,329,111 B1 * | 12/2001 | Nojiri et al. | 430/25 |
| 6,947,202 B2 | 9/2005 | Liang et al. | |
| 6,958,207 B1 | 10/2005 | Khusnatdinov et al. | |
| 7,136,216 B1 | 11/2006 | Daniel et al. | |
| 8,711,469 B2 * | 4/2014 | Yasui et al. | 359/296 |

(Continued)

FOREIGN PATENT DOCUMENTS

| | | |
|---|---|---|
| CH | 591 090 A5 | 9/1977 |
| EP | 0 782 037 A1 | 7/1997 |

(Continued)

OTHER PUBLICATIONS

French Search Report issued Mar. 31, 2011, in Patent Application No. 1055944 (with translation of Category of Cited Documents).

(Continued)

*Primary Examiner* — Arnel C Lavarias
(74) *Attorney, Agent, or Firm* — Oblon, McClelland, Maier & Neustadt, L.L.P.

(57) ABSTRACT

A microoptical device, and a method for forming cavities of the microoptical device, including: (a) forming, on the planar surface of a support substrate (10), a layer (12) of a sacrificial material, b) forming walls (6) of said cavities, the bottom of said cavities (4) being formed by said layer of sacrificial material, c) conformally depositing a layer (30) of absorbing, on tops (60) of the walls, on flanks (61, 62) of the walls, and on the bottom (4') of the cavities, d) etching the sacrificial layer (12), and removing the material of this layer and the material of the layer (30) of absorbing material being present at the bottom of the cavities (4).

18 Claims, 8 Drawing Sheets

(56) References Cited

U.S. PATENT DOCUMENTS

| | | | |
|---|---|---|---|
| 2002/0195932 A1* | 12/2002 | Steckl et al. | 313/509 |
| 2003/0076609 A1 | 4/2003 | Kawase | |
| 2004/0029303 A1 | 2/2004 | Hart et al. | |
| 2004/0135764 A1* | 7/2004 | Takeda | 345/107 |
| 2004/0161201 A1 | 8/2004 | Souriau | |
| 2004/0165252 A1 | 8/2004 | Liang et al. | |
| 2005/0275072 A1 | 12/2005 | Haluzak et al. | |
| 2006/0006336 A1 | 1/2006 | Cano et al. | |
| 2006/0275711 A1 | 12/2006 | Fu et al. | |
| 2007/0029277 A1 | 2/2007 | Jacobowitz et al. | |
| 2008/0037104 A1 | 2/2008 | Hagood et al. | |
| 2008/0123045 A1 | 5/2008 | Jeng et al. | |
| 2008/0212017 A1 | 9/2008 | Ballet et al. | |
| 2008/0212023 A1 | 9/2008 | Bovet et al. | |
| 2009/0027767 A1 | 1/2009 | Souriau | |
| 2009/0246546 A1 | 10/2009 | Keppner et al. | |
| 2009/0316110 A1 | 12/2009 | Cano et al. | |
| 2010/0014036 A1 | 1/2010 | Caplet | |
| 2012/0250138 A1* | 10/2012 | Yasui et al. | 359/296 |

FOREIGN PATENT DOCUMENTS

| | | |
|---|---|---|
| EP | 0 977 076 A2 | 2/2000 |
| EP | 1 672 394 A1 | 6/2006 |
| EP | 1 722 424 A1 | 11/2006 |
| EP | 1 791 197 A2 | 5/2007 |
| EP | 2 146 228 A1 | 1/2010 |
| FR | 2 872 589 A1 | 1/2006 |
| FR | 2 879 757 A1 | 6/2006 |
| FR | 2 888 948 | 1/2007 |
| FR | 2 888 953 | 1/2007 |
| FR | 2 897 164 | 8/2007 |
| GB | 2 435 717 A | 9/2007 |
| JP | 2002-323630 | 11/2002 |
| WO | WO 99/45143 A2 | 9/1999 |
| WO | WO 02/065215 A2 | 8/2002 |
| WO | WO 02/088671 A1 | 11/2002 |
| WO | WO 03/021346 A1 | 3/2003 |
| WO | WO 2006/052763 A2 | 5/2006 |
| WO | WO 2006/067309 A1 | 6/2006 |
| WO | WO 2006/067650 A1 | 6/2006 |
| WO | WO 2006/116616 A2 | 11/2006 |
| WO | WO 2007/090828 A1 | 8/2007 |
| WO | WO 2007/141525 A1 | 12/2007 |
| WO | WO 2009/026240 A1 | 2/2009 |
| WO | WO 2010/003821 A2 | 1/2010 |

OTHER PUBLICATIONS

Chiung-Wen Kuo, et al., "Monolithic integration of well-ordered nanoporous structures in the microfluidic channels for bioseparation", Journal of Chromatography A, vol. 1162, Aug. 2007, pp. 175-179.

S. Cheylan, et al., "Optical study of polymer infiltration into porous Si based structures", Proceedings of SPIEE, vol. 6593, May 2007, 11 sheets.

Nunc, Tapes, Lids, and Mats, Announcement Nunc International, XP007910887, Jan. 2006, 4 sheets.

M. Trejo-Valdez, et al., "Aerosol-gel deposition of photocurable ORMOSIL films doped with a terbium complex", Optical Materails, vol. 25, 2004, pp. 179-184.

Y. Nishijima, et al., "Inverse silica opal photnic crystals for optical sensing applications", Optics Express, vol. 15, No. 20, Oct. 1, 2007, pp. 12979-12988.

San Ming Yang, et al., "Opal Circuits of Light-Planarized Microphotonic Crystal Chips", Advanced Functional Materials, vol. 12, No. 6+7, Jun. 2002, pp. 425-431.

Matthieu Liger, et al., "Robust Parylene-to-Silicon Mechanical Anchoring", MEMS-03, IEEE, Micro Electro Mechanical Systems, the sixteenth Annual International Conference, Jan. 19-23, 2003, pp. 602-605.

* cited by examiner

MICROSTRUCTURE WITH WALLS OF DETERMINED OPTICAL PROPERTY AND METHOD FOR MAKING MICROSTRUCTURES

TECHNICAL FIELD AND PRIOR ART

The present application relates to making devices containing hermetically sealed cavities with microdimensions bounded by walls, wherein a working fluid, for example liquid crystals, is introduced.

It can for example be applied to fields wherein oriented liquid crystals are used in sealed cavities, or for making, in optics, optical lenses or optical glasses.

Another particular application relates to transparent "optical" components such as planar diffractive lenses where the working fluids are liquid with predefined optical indices.

One example of such optical element is illustrated in FIG. 1. It has a width W that can be up to 100 mm or more.

It includes an array of independent microgrooves or microcavities 2, separated by walls 6. These microcavities are structured on a flexible and planar substrate. The walls 6, and the microcavities, can be obtained by a collective microtechnology type method, or by anisotropic etching of a resin selected for its structural properties.

The cavities can then be filled with a liquid 4 suitable for the intended optical effect.

Then, the cavities are closed by a closing layer 9 of a flexible material, generally bonded on tops of the walls 6.

The whole is formed by a support including, in the illustrated example, a substrate 1 of a material such as quartz and a layer 8 of a polymeric material.

Such an optical element can contain a number of microgrooves that can be between a hundred thousand and ten millions.

It is intended for the walls 6 to be less visible as possible. For this, it is intended to make walls having a high aspect ratio (or shape factor), with a low width w (see FIG. 1), typically between 2 µm and 5 µm, for a resin height h in a range from 20 µm to 100 µm.

However, the presence of these walls still give rise to defects, in particular of optical element transparency, and more generally, still gives rise to quality degradation of the image formed through the optical element and/or performance degradation of the latter. Indeed, the walls defining pixels can interact with light by diffracting it and cause, in particular, a transparency loss.

One solution is to make absorbing walls 6 that will absorb part or all of the light, thus limiting the diffraction phenomena resulting in the optical element transparency defects.

It is known that walls can be made by direct photolithography of an absorbing photosensitive material, but commercially available materials have not been identified which enable to obtain absorbing walls with a height h high enough, typically higher than 20 µm, with a width w low enough, typically lower than 5 µm. Today, photosensitive absorbing materials and photolithographic techniques associated therewith enable walls with a maximum height in the order of 5 µm to be obtained, which is still much lower than expected.

Another solution is that already formed walls 6 are made absorbing, by incorporating therein an absorbing material and/or absorbing particles. This result can be obtained by doping, diffusion or else dipping techniques. However, this technique does not still completely meets the needs, because the metal particles or pigments being used have too high sizes with respect to the dimensions w and h of the walls defined above. For colorants, there is also the ageing issue and fast effects of absorbency loss resulting therefrom.

Therefore, there is a need for a new method in particular enabling walls to become absorbing, the bottoms of the cavities generally remaining transparent. Such a method is preferably compatible with making high aspect ratio cavities, in order to limit or remove optical disturbances.

Another problem is how to make reflecting walls 6. This is in particular the case in view of applications to TFT-LCD moving screens: a small part (4-5%) of inner structures of the screen is covered with reflecting microstructures in order to improve contrast. Thus, a user perfectly distinguishes images even if the screen is exposed to direct sunlight.

BRIEF DESCRIPTION

A method is disclosed for forming cavities of a microoptical device, including:
a) forming, on a surface of a support substrate, a layer of a sacrificial material,
b) forming walls of said cavities, the bottom of said cavities being formed by said layer of sacrificial material,
c) conformally depositing a layer of so-called optical material having a determined optical property, on tops of the walls, on flanks of the walls, and on the bottom of the cavities,
d) etching the sacrificial layer, and removing the material of this layer and the material of the portion of the layer of optical material being present at the bottom of the cavities.

The layer of optical material is an absorbing layer or a reflecting layer. If the optical material is absorbing, it can include black chromium, or black molybdenum or amorphous carbon.

The material of the sacrificial layer includes, for example, silicon oxide SiO2, or silicon nitride SiN, or tin-doped indium oxide (ITO) or amorphous carbon, or black molybdenum, or else black chromium.

The sacrificial layer is advantageously transparent for a particular spectral range.

The layer of optical material, deposited in step c, is advantageously porous. According to one embodiment, etching the sacrificial layer can then be carried out using a wet etching solution, the porosity of the absorbing layer being sufficient for passing the etching solution to the sacrificial layer.

Advantageously, walls formed in step b) have an aspect ratio (h/w) between 10 and 20, h being the wall height above the free surface of the support substrate.

Walls can be formed at the surface of the sacrificial layer, this being continuous from cavity to cavity until during step c, the walls bearing, after step d, on a portion of sacrificial material.

Alternatively, the bottom of walls bears on, or even in, the support substrate itself.

A method is also disclosed for forming a microoptical device, including:
forming cavities of this device, including implementing a method as above,
introducing one or more fluids into said cavities of the device,
forming a closing layer on the walls of the cavities.

A microoptical device is also disclosed, including cavities defined by walls, a layer of optical material (with the meaning already defined above) being formed on tops of the walls and on flanks of the walls, whereas the bottom of the cavities is transparent.

According to one embodiment, the bottom of each wall bears on a portion of sacrificial material, and the layer of optical material does not overlie the flanks of this portion of sacrificial material.

Alternatively, the bottom of each wall (6) bears on the substrate or in the substrate, and the layer of optical material does not overlie a portion of the flanks of the walls which is located in the vicinity of the surface of the substrate.

Each cavity can be at least partially filled with a fluid, and all of the cavities can be closed by a closing layer.

The optical material can have one or more properties (absorbing or reflecting, porous, etc.) already set out above.

The walls can have a height in the order of a few $\mu m$ to a few tens of $\mu m$, for example between 1 $\mu m$ and 100 $\mu m$.

They can have a width in the order of a few $\mu m$ or submicronic, for example between 0.5 $\mu m$ and 5 $\mu m$.

DETAILED DESCRIPTION OF PARTICULAR EMBODIMENTS

Figure 1:
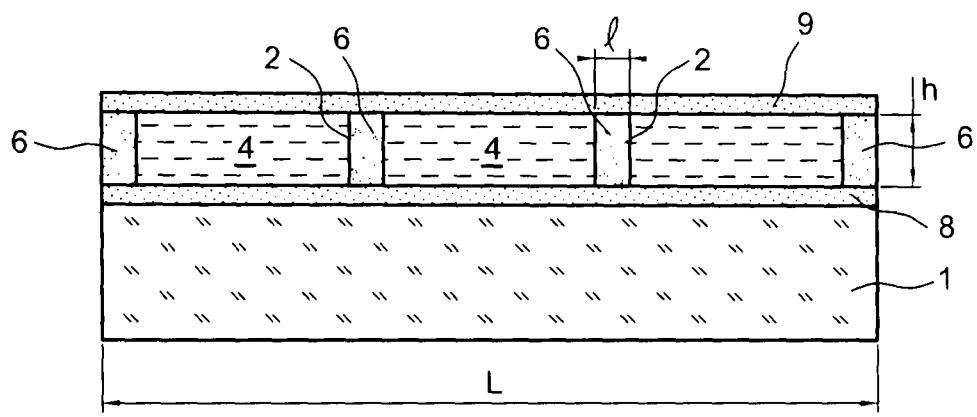
FIG. 1 represents a known cavity structure.

A first embodiment will now be described in connection with FIGS. 2A-2I.

First, a support is prepared, which can consist of a single substrate 10 (FIG. 2A), for example of a polymeric material such as PET or of glass or silicon. Alternatively, this is a flexible layer such as polyethylene terephthalate "PET" held by temporary bonding on a rigid support (the latter is not shown in the figures).

On a planar surface 10' of such substrate 10, a planar layer or planar film 12, of a so-called sacrificial material is formed, (FIG. 2B) with a thickness for example between 50 nm and 200 nm.

This sacrificial material is advantageously transparent to visible light (350-700 nm) and near/middle infrared (0.7-10 $\mu m$) depending on the desired application (visible imaging or infrared detection) because it is still present in the ultimate microdevice under the walls of the microcavities. This layer 12 is thus of a transparent material, that is for example silicon oxide SiO2 (efficient in visible light), or silicon nitride SiN (efficient in near IR except between 1.3 and 1.55 $\mu m$) or tin-doped indium oxide (ITO) or else amorphous carbon (for middle infrared).

These different materials can be deposited using methods such as, for example, evaporation, PVD, PECVD, CVD or ALD.

Whether transparent or absorbing, the sacrificial material 12 is preferably selected so that it can be subsequently etched with a wet solution.

Structuring walls 6 of microcavities 4 is then performed.

Depending on the contemplated application and the desired performances, the working fluid thickness can be variable:

a low thickness, close to the micrometer, can be desired in liquid crystal display type applications;

whereas a high thickness, in the order of several tens of microns, is desirable in the case of planar diffractive lenses.

Thus, if the very nature of the working fluid desired to be introduced into the cavities is known, the height h of the portion of walls which is situated above the free surface of the substrate can be adapted, when making the walls. In some cases, the purpose will be to make walls with a height h in the order of the micrometer, for example between 1 $\mu m$ and 5 $\mu m$ or 10 $\mu m$, whereas, in other cases, the purpose will be to make walls the height of which is in the order of one ten of micrometers or several tens of micrometers, for example between 10 $\mu m$ and 100 $\mu m$.

In the case of walls the height of which is in the order of one $\mu m$ of thickness (typically between 1 $\mu m$ and 10 $\mu m$), several techniques can be implemented, such as micromoulding, or screen printing, or photolithography or plasma etching.

In the case of the higher height (typically between 10 $\mu m$ and 100 $\mu m$), a sufficiently low wall width w is obtained, in the order of one micron and typically lower than 5 $\mu m$, for example between 1 $\mu m$ and 5 $\mu m$, for example by photolithography, in particular of thick resin. In other words, in this case, photolithography technique is advantageously preferred to plasma etching technique. This photolithography technique thus enables walls to be obtained with a relatively high height, with a large aspect ratio, for example between 10 and 20.

Figure 2A:
FIGS. 2A-2F represent steps for carrying out a method as disclosed in this application.
Figure 2B:
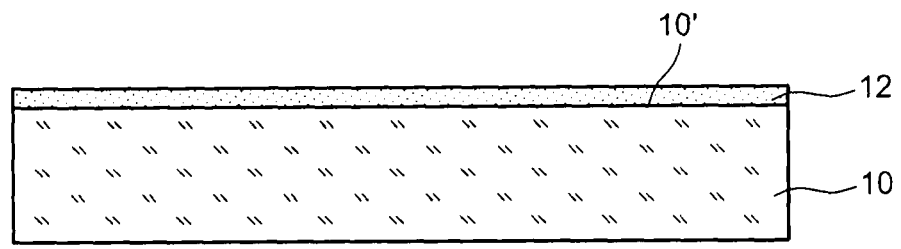
Figure 2C:
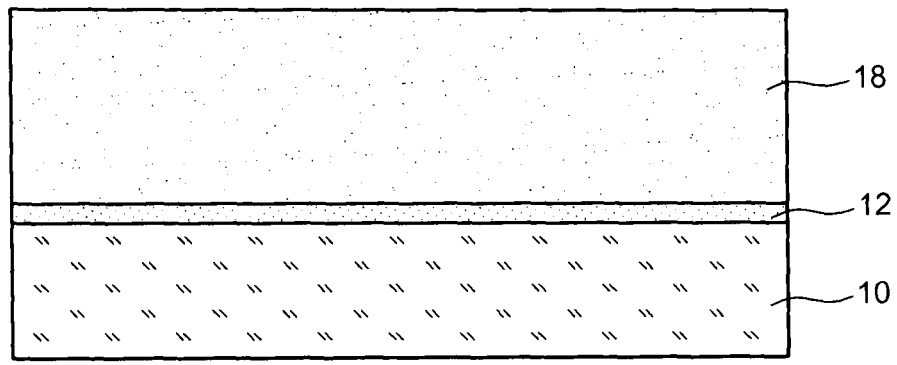
Figure 2D:
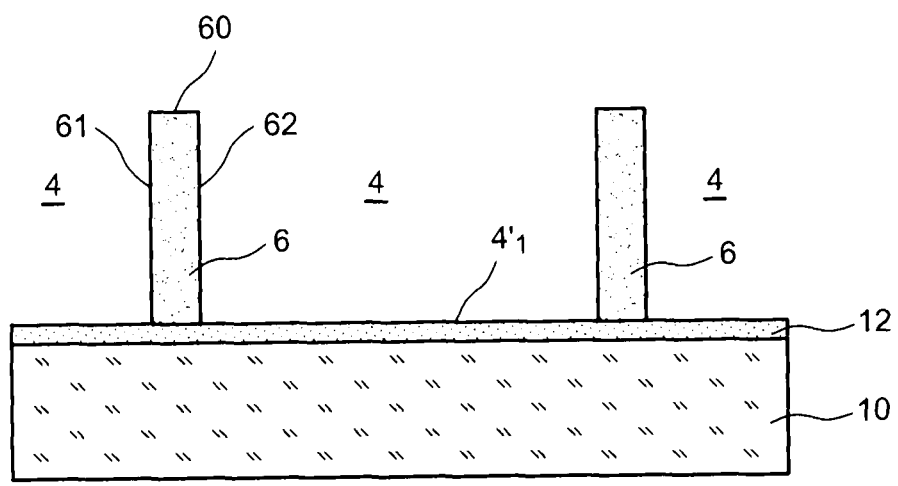

One exemplary implementation of the latter technique is represented in FIGS. 2C and 2D: a thick photosensitive resin 18 is deposited on the sacrificial layer 12. This resin is then insulated (FIG. 2D), with a suitable mask, and then developed according to techniques commonly used in microelectronics.

Walls 6 of cavities 4 are thus obtained. They are substantially perpendicular to the planar surface 10' of the substrate and to the sacrificial layer 12. The latter is little or not affected by this wall forming operation.

This results in a structure including a layer 12, which is continuous, planar and extends under the walls 6 (FIG. 2D). The latter can have a high aspect ratio h/w, for example between 10 and 20. The height h of the obtained walls can be between 20 $\mu m$ and 100 $\mu m$, with a width w between 2 $\mu m$ and 5 $\mu m$. But, as already indicated above, walls having different geometrical characteristics, and in particular walls with a lower height, for example lower than 10 $\mu m$ can be obtained by a method as disclosed in this application.

Then, on the entire device (FIG. 2E), a conformal layer 30 is deposited, with a thickness typically between 50 nm and 500 nm, which is of a material absorbing into visible light and/or near infrared and/or middle infrared, still depending on the desired application. This layer enables part or all of the light to be absorbed and thus diffraction phenomena resulting in transparency losses of the optical element to be limited. Preferably, amorphous carbon or black chromium/molybdenum is selected for visible spectral field or nanocrystalline diamond for near infrared and/or middle infrared.

This layer is applied against, and continuously covers, the top 60 of walls 6, the flanks 61, 62 of the walls, and the bottom 4'1 of the cavities.

For example, the nanocrystalline diamond layer is preferably deposited by plasma-assisted chemical vapour deposition (PACVD), the black molybdenum layer by chemical vapour deposition (CVD) and the black chromium layer by physical vapour deposition (PVD) or by e-beam evaporation.

Preferably, this absorbing layer 30 has a porosity sufficient to enable etching the sacrificial layer 12 by a wet etching solution through the absorbing layer. Then, it will be considered as a non-porous layer for a porosity range lower than 10% and as a porous layer for porosities ranging from 10% to 50%. This porosity can also be adjusted by means of deposition parameters. For example, a black chromium layer deposited by "e-beam evaporation" on a cold substrate has a porosity in the order of 40% and this porosity decreases to 16% when the substrate is heated (300° C.) during depositing.

Figure 2E:
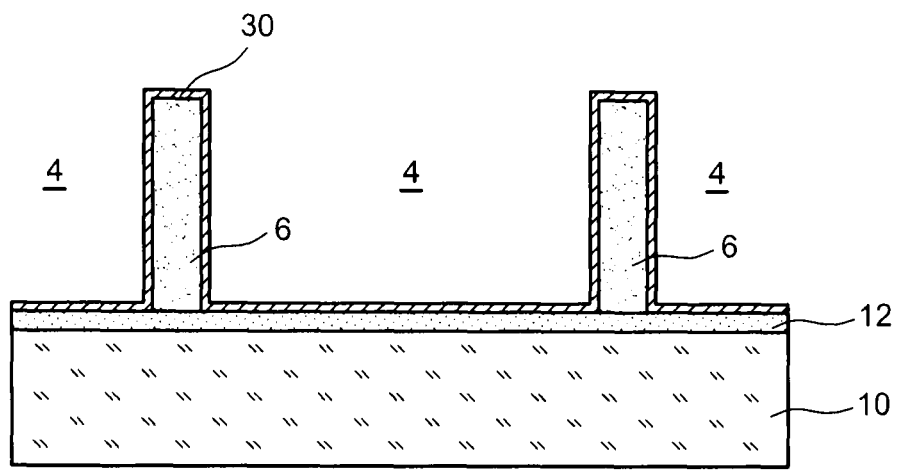
Figure 2F:
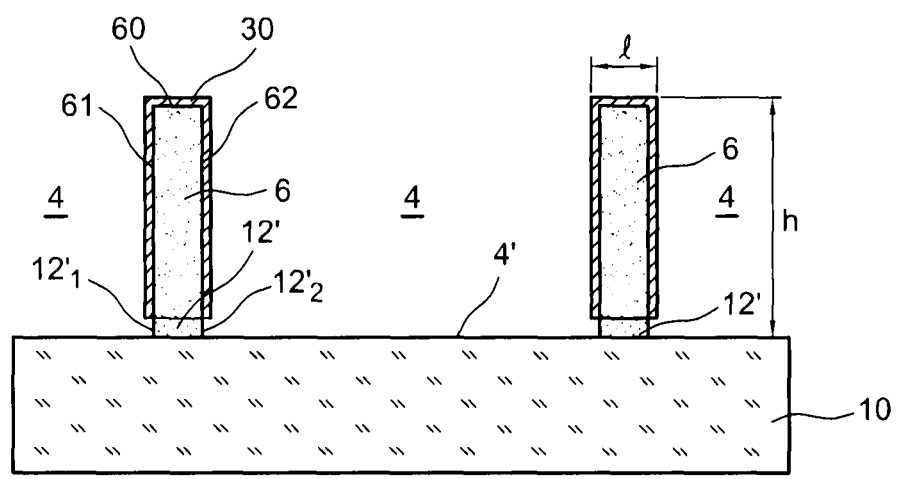

Thus, a wet etching of the sacrificial layer 12 is then performed, for example by means of an acid or basic etching (FIG. 2F). Preferably, the porosity of the absorbing layer 30 present at the bottom 4'1 of the cavities is adjusted to enable etching of the sacrificial layer 12 and withdrawing of the absorbing layer 30 at the bottom of cavities by a so-called "lift-off" effect.

Figure 3A:
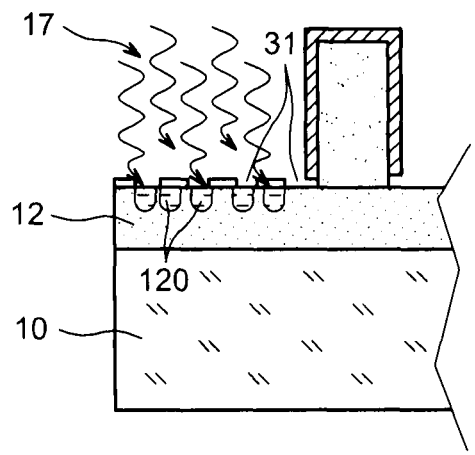
FIGS. 3A-3D represent some steps for making a wet etching in a method as disclosed in this application.
Figure 3B:
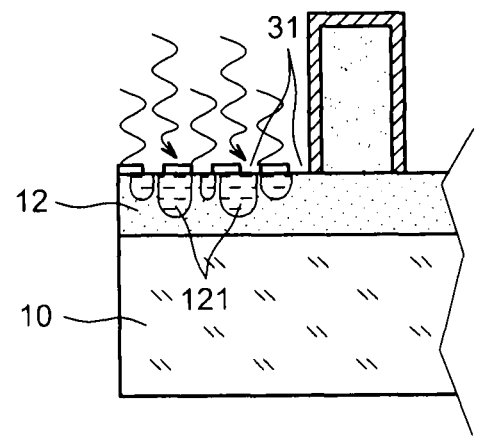
Figure 3C:
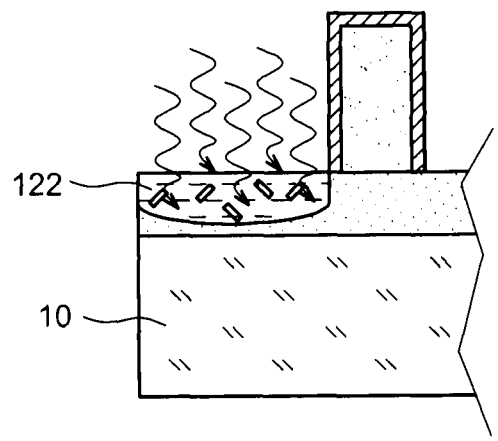
Figure 3D:
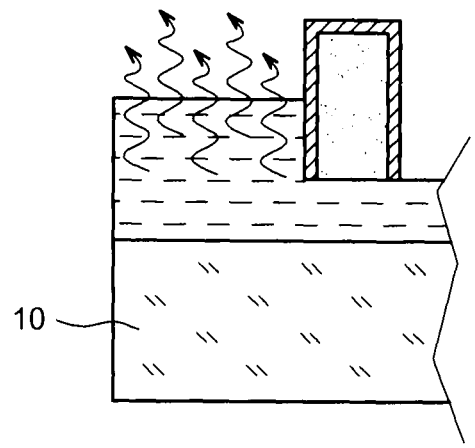

This step is represented in a more detailed way in FIGS. 3A-3D. The etching solution goes under the absorbing layer 30, through the pores 31 thereof, to etch the sacrificial layer 12 (FIGS. 3B and 3C) until etching is sufficiently advanced to raise the portion of the absorbing layer 30 which is at the bottom of the cavity (FIG. 3D). The amount of absorbing material, thus raised and mixed with the etching solution 17, is thus removed during withdrawing of the latter (FIG. 3D). As can be seen in these figures, the solution 17 will gradually etch the material of the layer 12 through the pores 31, the etched areas being designated on FIGS. 3A-3C by references 120, 121, 122, the size of which increases as the method advances.

Finally (FIG. 2F), the tops 60 and flanks 61, 62 of the walls 6 are still covered with the absorbing material 30. There is a remaining portion 12' of sacrificial layer under the walls 6, with the same width as the wall 6, and the layer 30 does not cover the flanks 12'1, 12'2 of this portion 12', on a height which is substantially equal to, or close to, the thickness of this layer 12'. The bottoms 4' of the cavities 4 thus formed are cleared from the material 12.

The etching solution 17 is chosen so as to be selective to the material making up the absorbing layer 30 and also to the material making up walls 6, in order not to etch the absorbing layer just deposited, and not to etch walls 6. Thus, for example, the wet etching solution will be a partially diluted hydrofluoric acid (HF) solution buffered by ammonium fluoride (NH4F) in the case of a sacrificial layer 12 of silicon dioxide SiO2, of an absorbing layer 30 of black chromium, and of walls 6 of solgel organosilicon material.

The wet etching is also controlled so as not to spread the "lift-off" effect to the walls by overetching under the walls 6. If etching is too high, then etching areas of the layer 12 will also be formed under wall 6, which will lose its stability. For this, the etching time by the wet solution is controlled. The sacrificial layer 12 has a width, for example, in the order of 100 nm to 250 nm and the walls have a thickness that can be from 2 μm to 5 μm. The walls can thereof have a width 10 to 50 times higher than the thickness of the layer 12. Even if it is assumed that side etching (under the walls) is as quick as vertical etching (under the absorbing layer), the side etching can be stopped early enough, at a time when the absorbing layer is already etched.

One alternative embodiment, with another mode for forming walls, will now be described in connection with FIGS. 4A-4G.

Starting from the configuration of FIG. 2B, with the substrate 10 and its sacrificial layer, a layer 16 of hard mask (for example a chromium layer, with 50 nm thickness) is deposited, followed by a mask 17 of resin (FIG. 4A), which will enable to define the locations and the width of future walls and to etch the sacrificial layer but also possibly a portion of the substrate 10. The walls will then be formed in etched areas in these layers 16, 17. If etching in the material of the substrate 10 is sustained, the mechanical resistance of future walls 6 (FIG. 4B) is enhanced.

A resin 18 (FIG. 4C) is then spread. It penetrates the etched areas, including possibly within the substrate 10. Unlike the preceding embodiment, the sacrificial layer is then non continuous on the entire substrate 10.

Then, walls 6 of the microcavity are formed in this resin 18 (FIG. 4D), for example by one of the techniques already recited above. The mask layer 17 and the hard mask layer 16 are then removed (FIG. 4E), preferably by a soft method, selective to the layer 12, affecting the latter as little as possible. This method is for example an HF etching, with a surfactant, BE3O:1, which gives good results.

Then, on the entire device, a conformal layer 30 is deposited (FIG. 4F), the nature, porosity and optical and thickness characteristics of which being those already indicated above, in particular in connection with FIG. 2E. Again, this layer is applied against, and continuously covers, the sacrificial layer 12, but also the top 60 of walls 6, and the flanks 61, 62 of the walls.

Figure 4A:
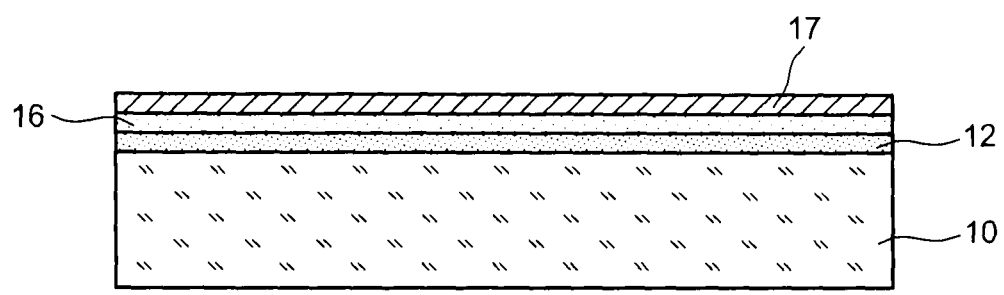
FIGS. 4A-4G represent an alternative for forming cavity walls.
Figure 4B:
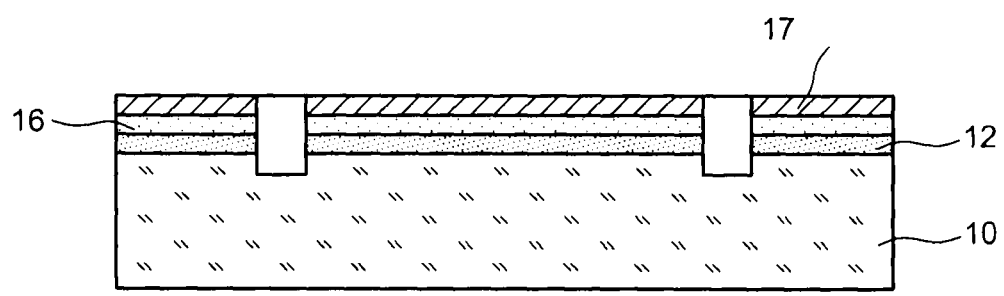
Figure 4C:
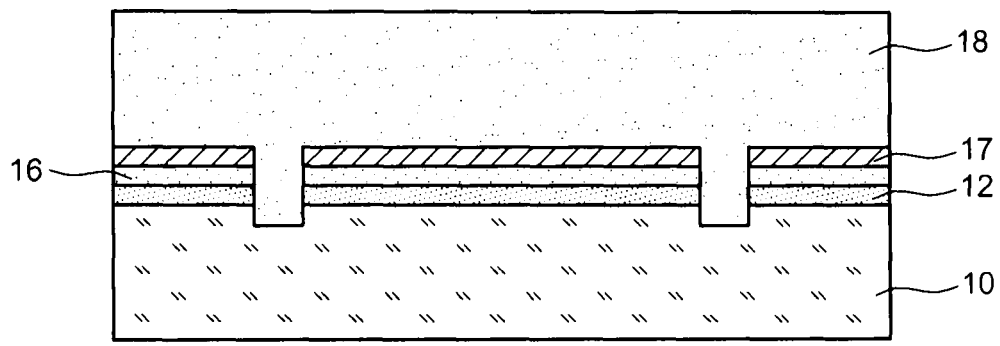
Figure 4D:
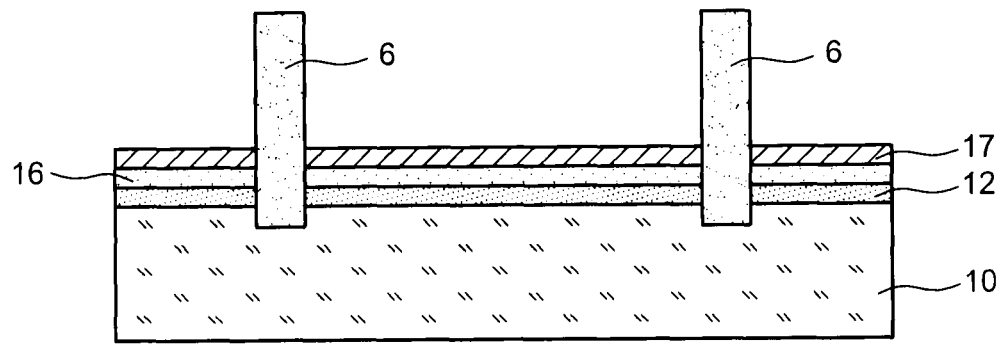
Figure 4E:
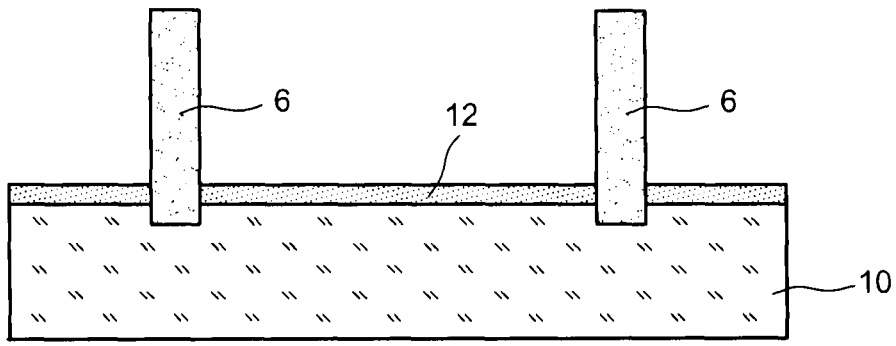
Figure 4F:
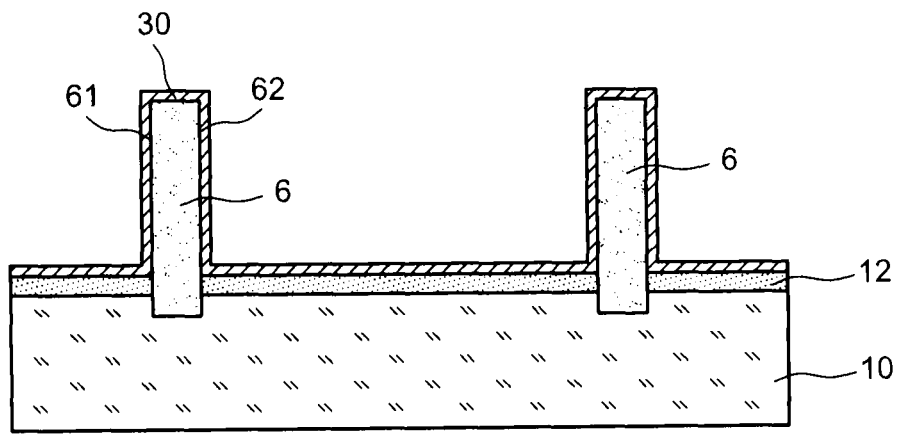
Figure 4G:
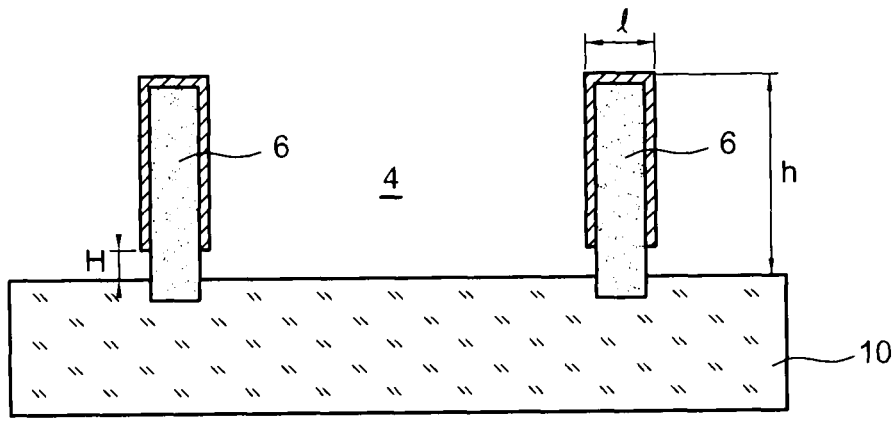

Then, wet etching of the sacrificial layer 12 is performed, for example by means of an acid or basic etching (FIG. 4G). As in the case of FIG. 2F, preferably, the porosity of the absorbing layer 30 being present at the bottom 4'1 of the cavities is adjusted to enable etching of the sacrificial layer 12 and withdrawing of the absorbing layer 30 at the bottom of cavities by a "lift-off" effect. Again, the above explanations can be referred to (FIGS. 3A-3C) regarding the etching mechanism through the pores 31 of the layer 30 and the selection of the etching solution.

Finally (FIG. 4G), the tops 60 and flanks 61, 62 of walls 6 are still covered with the absorbing material 30. This time, there is no remaining portion of sacrificial layer under walls 6, but the layer 30 does not cover the lower portions of flanks 61, 62 of the wall, which portions are located between the free surface of the substrate 10 and the bottom of the layer 30, on a height H substantially equal to the thickness of the previous layer 12 or approximately equal to the sum of the thicknesses of the previous layer 12 and the layer 30.

The above making methods have been described with a layer 30 having absorbing properties. But, alternatively, this layer may have reflecting properties, which can be of interest for making TFT-LCD movable screens, since a little part (4-5%) of inner structures of the screen is covered with reflecting microstructures to improve contrast: thus, a user perfectly distinguishes images even if the screen is exposed to direct sunlight. The method for making cavities with reflecting walls is similar to that for absorbing walls.

In any case, a structure is obtained including cavities 4 defined by walls 6 covered with a layer 30 of a material having a specific optical property, that is absorbing or reflecting. Under walls 6, there can be found a remaining portion 12' of material as in FIG. 2F. Walls 6 can have a height h, above the free surface of the substrate 10, in the order of a few μm to several tens of μm and for example higher than 10 μm, further for example between 5 μm and 50 μm. Their width w can be in the order of a few μm or be submicronic, for example lower than 5 μm or between 5 μm and 0.5 μm. Other value ranges for these geometrical parameters have already been given in the above description.

Filling one or more cavities can then be carried out by an equipment E (FIG. 5A) for inside the cavities 4 and projecting the liquid material 24 as a jet or drops 26, having a volume that can be in the order of several picoliters. The liquid can be delivered using a technique suitable for use in low volume location, that is several tens to hundreds of picoliters. The equipment E used can implement a liquid dispensing technique similar to the one of ink jet dispensing.

The liquid material 24 can partially or completely fill cavities 4. A full filling of the cavities can be carried out so as to reach the top 60 of walls 6.

The product is ended by reporting (in the simplest case by laminating) a protective film 9 (FIG. 5B), such as a plastic film, being identical or not to the material of the support 10. This film is possibly covered with functional layers designed for the final function (antiglare, hard layers, antifouling, ... ).

Figure 5A:
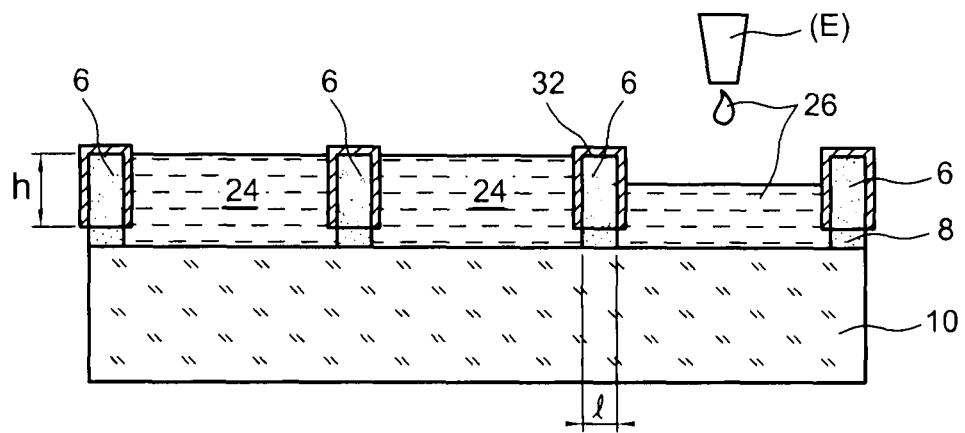
FIGS. 5A and 5B represent steps for filling cavities with a liquid, and then for closing these cavities with a film.
Figure 5B:
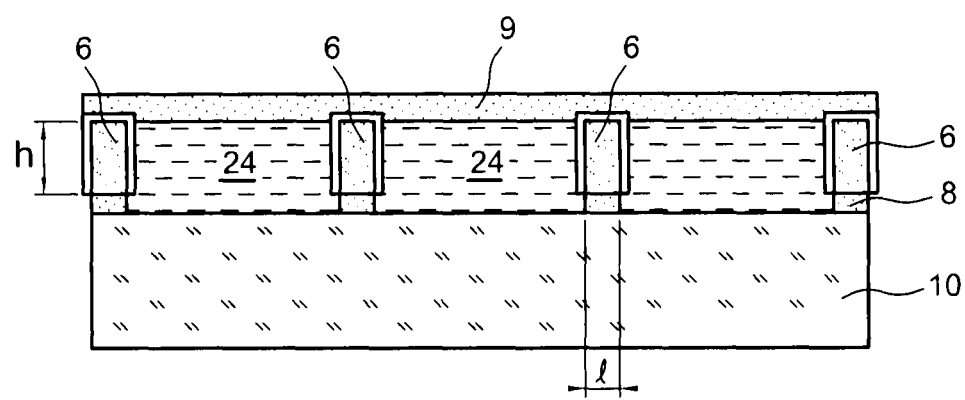

FIGS. 5A and 5B relate to the case of a component made from the structure of FIG. 2F, but another component can also be obtained from the structure of FIG. 4G, by filling the cavities and reporting a protective film 9, as explained above.

A customisation of the final product can be carried out prior to reporting it on a final surface as, for example, glasses lens. This customisation can be advantageously carried out on the rigid support used for making the stack, although not required. If the customisation occurs on the making support, it can be made through laser, ultrasounds or with a cutting tool. A technique having the following qualities will be preferred: ensuring presealing of the periphery, ensuring a good surface condition of the slice for an optimum sealing, and a high speed execution suitable for industrialization. This customisation is accompanied with a peripheral sealing which ensures gas-thickness and moisture proofness, a good mechanical resistance over the lifetime of the product, a visual quality suitable for consumer products (when necessary, for example for glasses).

The invention claimed is:

1. A method for forming cavities of a microoptical device, including:
   a) forming, on a surface of a support substrate, a layer of a sacrificial material,
   b) forming walls of said cavities, a bottom of said cavities being formed by said layer of sacrificial material,
   c) conformally depositing a layer of optical material having a determined optical property, on tops of the walls, on flanks of the walls, and on the bottom of the cavities, said optical material being a porous material,
   d) etching the sacrificial layer, and removing the material of the sacrificial layer and the material of the portion of the layer of optical material being present at the bottom of the cavities, and
   (e) introducing one or more fluids into said cavities of the device to be in contact with the layer of optical material.

2. The method according to claim 1, wherein the layer of optical material is an absorbing layer or a reflecting layer.

3. The method according to claim 2, wherein the optical material is absorbing and includes black chromium, or black molybdenum or amorphous carbon.

4. The method according to claim 1, wherein the material of the sacrificial layer includes silicon oxide SiO2, or silicon nitride SiN, or tin-doped indium oxide (ITO) or amorphous carbon, or black molybdenum, or else black chromium.

5. The method according to claim 1, wherein etching the sacrificial layer is carried out using a wet etching solution through the porous optical material.

6. The method according to claim 1, wherein the walls formed in step b) have an aspect ratio (h/w) between 10 and 20.

7. The method according to claim 1, wherein the walls are formed at a surface of the sacrificial layer, which is continuous from cavity to cavity until during step c, the walls bearing, after step d, on a portion of sacrificial material.

8. The method according to claim 1, wherein the walls are formed in etched areas at least of the sacrificial layer.

9. The method according to claim 8, wherein the walls are formed in etched areas of the sacrificial layer and the substrate.

10. A method for forming a microoptical device, including:
    forming cavities of this device, including implementing a method according to claim 1, and
    forming a closing layer on the walls of the cavities.

11. A microoptical device, including cavities bounded by walls, a layer of optical, porous, material being formed on tops of the walls and on flanks of the walls, whereas a bottom of the cavities is free from the layer of the optical, porous, material, the cavities being at least partially filled with a fluid that is in contact with the layer of optical, porous, material.

12. The device according to claim 11, wherein the bottom of each wall bears on a portion of sacrificial material, and the layer of optical, porous, material does not overlie the flanks of the portion of sacrificial material.

13. The device according to claim 11, wherein the bottom of each wall bears on the substrate or in the substrate, and the layer of optical, porous, material does not overlie a portion of the flanks of the walls which is located in a vicinity of the surface of the substrate.

14. The device according to claim 11, wherein the layer of optical material is an absorbing layer or a reflecting layer.

15. The device according to claim 14, wherein the optical, porous, material is absorbing, and includes black chromium, or black molybdenum or amorphous carbon.

16. The device according to claim 11, wherein the walls have a height between 1 μm and 100 μm.

17. The device according to claim 11, wherein the walls have a width between 0.5 μm and 10 μm.

18. The device according to claim 11, wherein the fluid includes liquid crystals.

\* \* \* \* \*